United States Patent [19]

Naka et al.

[11] Patent Number: 6,096,674
[45] Date of Patent: Aug. 1, 2000

[54] HEAT-RESISTANT HC ADSORBENT

[75] Inventors: Takahiro Naka; Tetsuo Endo; Haruhiko Shimizu; Yoshikazu Fujisawa, all of Wako; Muneo Mita; Kenji Agemoto, both of Tokyo, all of Japan

[73] Assignees: Honda Giken Kogyo Kabushiki Kaisha; Nippon Chemical Industrial Co., Ltd., both of Tokyo, Japan

[21] Appl. No.: 09/147,527

[22] PCT Filed: Mar. 17, 1997

[86] PCT No.: PCT/JP98/01123

§ 371 Date: Jan. 14, 1999

§ 102(e) Date: Jan. 14, 1999

[87] PCT Pub. No.: WO98/55222

PCT Pub. Date: Dec. 10, 1998

[30] Foreign Application Priority Data

Jun. 3, 1997 [JP] Japan ................... 9-145529

[51] Int. Cl.⁷ ............... B01J 29/06; B01J 29/87
[52] U.S. Cl. ................... 502/60; 502/61; 502/64; 502/71; 502/232; 502/233; 502/234; 502/235; 502/355; 502/407

[58] Field of Search .................. 502/60, 61, 64, 502/71, 232, 233, 234, 235, 355, 407

[56] References Cited

U.S. PATENT DOCUMENTS

| 5,010,048 | 4/1991 | Petit et al. ................. 502/61 |
| 5,281,566 | 1/1994 | Marcilly et al. ............ 502/61 |
| 5,306,684 | 4/1994 | Itoh et al. .................. 502/61 |
| 5,354,719 | 10/1994 | Gabelica et al. ........... 502/62 |
| 5,741,948 | 4/1998 | Kirishiki et al. ........... 502/71 |

FOREIGN PATENT DOCUMENTS

| 53-76199 | 7/1978 | Japan . |
| 64-34440 | 2/1989 | Japan . |
| 2-18318 | 1/1990 | Japan . |
| 2-71842 | 3/1990 | Japan . |
| 6-312132 | 11/1994 | Japan . |
| 7-166852 | 6/1995 | Japan . |

*Primary Examiner*—Elizabeth D. Wood
*Attorney, Agent, or Firm*—Arent Fox Kintner Plotkin & Kahn, PLLC

[57] ABSTRACT

An HC adsorbent has an MFI-type metallo-silicate including at least one of gallium and indium as a framework forming element, and aluminum (Al) in the MFI-type metallo-silicate in a content of Al$\leq 0.05\%$ by weight. Such an HC adsorbent has an excellent heat-resistance.

4 Claims, 5 Drawing Sheets

6,096,674

HEAT-RESISTANT HC ADSORBENT

FIELD OF THE INVENTION

The present invention relates to a heat-resistant HC (hydrocarbon) adsorbent for use in an exhaust system in an automobile or the like.

BACKGROUND ART

Various configurations of exhaust emission control catalysts disposed in an exhaust system of an automobile are known. However, the usual exhaust emission control catalyst exhibits a purifying ability by oxidation in a high temperature range of an exhaust gas, e.g., about 180° C. or more, and exhibits an extremely low purifying ability with respect to an exhaust gas having a low temperature immediately after an engine is started and containing HC at a high concentration.

Therefore, to catch HC in the low-temperature exhaust gas, it is contemplated that an HC adsorbent is disposed in the exhaust system downstream of the catalyst. In this case, zeolite is used as the HC adsorbent.

The temperature of the exhaust gas flowing in the exhaust system is generally on the order of 1,000° C., and for this reason, a heat resistance accommodating such temperature is required for the HC adsorbent.

There has been proposed a zeolite having a high silica/alumina, ratio and containing a reduced amount of aluminum which becomes a starting point of thermal deterioration, in order to enhance the heat resistance. However, even the zeolite suffers from a problem that the heat resistance thereof is not improved sufficiently, and the HC adsorbing and desorbing ability is also low.

DISCLOSURE OF THE INVENTION

It is an object of the present invention to provide an HC adsorbent of the above-described type, which has a sufficiently improved heat-resistance and a good HC adsorbing/desorbing ability.

To achieve the above object, according to the present invention, there is provided a heat-resistant HC adsorbent comprising an MFI-type metallo-silicate including at least one of gallium (Ga) and indium (In) as a framework forming element, and having aluminum (Al) in a content of $Al \leq 0.05\%$ by weight.

The MFI-type metallo-silicate has a three-dimensional framework structure, representatively as does an MFI-type aluminosilicate, e.g., a ZSM-5 zeolite. The Ga site and In site in such structure correspond to the Al site of the ZSM-5 zeolite. Moreover, gallium (Ga) and indium (In) have a high bonding force in the three-dimensional framework structure and exhibit a characteristic that they are difficult to be released from the structure.

The HC adsorbent comprising the MFI-type metallo-silicate having such a three-dimensional framework structure and having the aluminum content set in the above-described range has a high heat-resistance and a good HC adsorbing/desorbing ability.

However, if the aluminum content is larger than 0.05% by weight, the heat resistance is lowered. In the MFI-type metallo-silicate, it is desirable from the viewpoint of enhancement in heat resistance that the aluminum content is zero. However, it is difficult to suppress the aluminum content to zero, because aluminum is contained as an impurity in a starting material in the synthesis of the MFI-type metallo-silicate. Therefore, it can be said that the lower limit of the aluminum content is a value extremely near zero.

BRIEF DESCRIPTION OF THE DRAWINGS

FIG. 1 is a graph showing the relationship between a gas temperature and an adsorption rate of $C_5H_{10}$ as well as a desorption rate of $C_5H_{10}$ in an MFI-type gallium-silicate in a new state or the like;

FIG. 2 is a graph showing the relationship between the gas temperature and the adsorption rate of $C_5H_{10}$ as well as the desorption rate of $C_5H_{10}$ in the MFI-type gallium-silicate after being subjected to an aging treatment or the like;

FIG. 4 is a graph showing the relationship between the gas temperature and the adsorption rate of $C_5H_{10}$ as well as the desorption rate of $C_5H_{10}$ in an MFI-type indium-silicate in a new state or the like;

FIG. 5 is a graph showing the relationship between the gas temperature and the adsorption rate of $C_5H_{10}$ as well as the desorption rate of $C_5H_{10}$ in the MFI-type indium-silicate after being subjected to the aging treatment or the like.

BEST MODE FOR CARRYING OUT THE INVENTION

Figure 1:
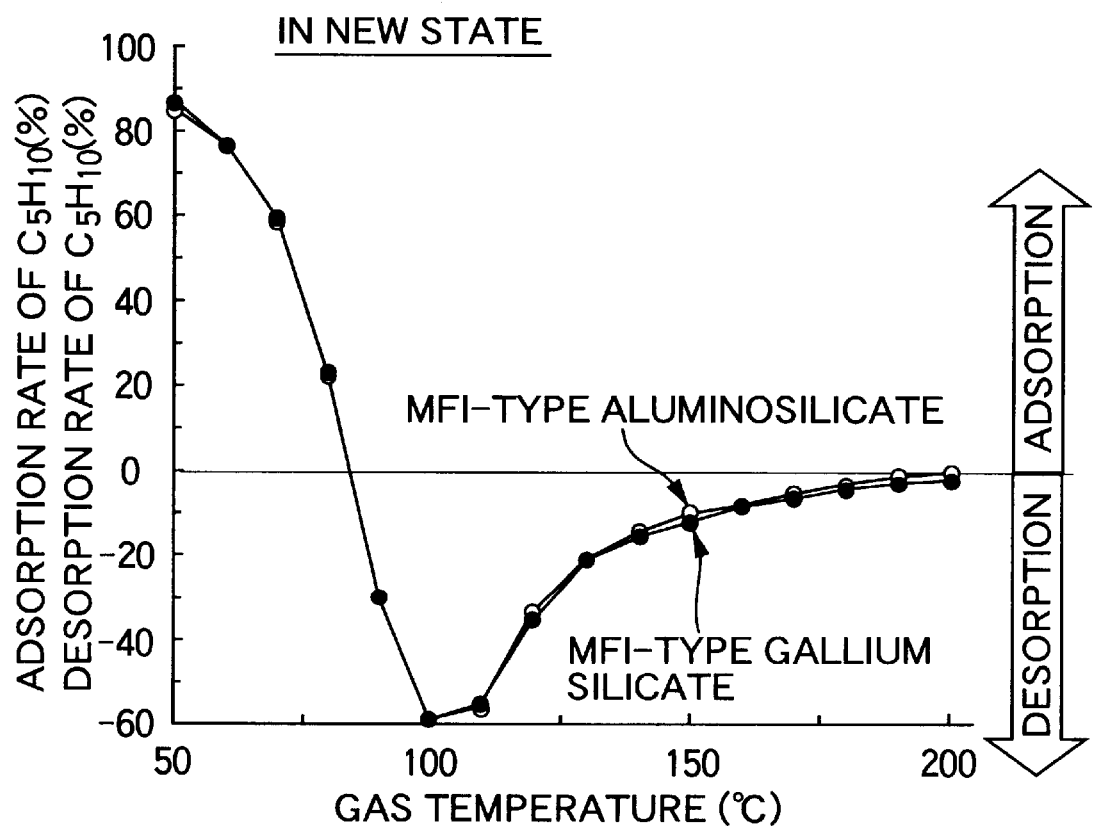

I. Synthesis of MFI-type Gallium Silicate (1) A first starting material was prepared in an amount of 11.9 kg by mixing 6.5 kg of a colloidal silica available on the market (containing 30% by weight of $SiO_2$ and 0.4% by weight of $Na_2O$), 0.4 kg of TPA-Br (tetrapropyl ammonium bromide, a template agent) and 5 kg of pure water.

(2) A second starting material was prepared in an amount of 8.3 kg by mixing 15.2 g of gallium chloride ($GaCl_3$ with a purity of 99.999%), 0.3 kg of sodium hydroxide, and 8 kg of pure water.

(3) The first starting material was placed into a stainless vessel, and the second starting material was gradually added to the first starting material, while agitating the first starting material.

(4) A mixture of the first and second starting materials was agitated for 30 minutes to provide an entirely uniform alkali gel of gallium silicate. The composition of the alkali gel was as follows: The mole ratio of $SiO_2/Ga_2O_3=750$; the mole ratio of $Na_2O/SiO_2=0.133$; the mole ratio of $H_2O/Na_2O=226$; and the mole ratio of $TPA-Br/SiO_2=0.05$.

(5) The alkali gel was thrown into an autoclave where it was maintained at 170° C. for 24 hours with agitation for crystallization, thereby providing a crystal slurry.

(6) The crystal slurry was subjected to a solid-liquid separation treatment to provide a solid component and then, the solid component was washed and then filtered to provide a cake.

(7) The cake was dried at 110° C. for 24 hours and then calcined at 550° C. for 12 hours using an electric oven. Thereafter, the calcined product was pulverized to provide about 1.3 kg of a powdery MFI-type gallium silicate.

The content of Ga in the MFI-type gallium silicate was equal to 0.4% by weight, and the Al content was equal to 0.04% by weight. This aluminum is considered as being incorporated in the colloidal silica available on the market.

II. Synthesis of MFI-type Aluminosilicate

About 1.3 kg of a powdery MFI-type aluminosilicate (ZSM-5 zeolite) was produced in the same manner as in the item I, except that sodium aluminate (containing 52.7% by weight of $Al_2O_3$ and 41.9% by weight of $Na_2O$) was used in place of the gallium chloride used in the item I.

In this case, the composition of the alkali gel of the aluminosilicate was as follows: The mole ratio of $SiO_2/Al_2O_3$=750; the mole ratio of $Na_2O/SiO_2$=0.133; the mole ratio of $H_2O/Na_2O$=226; and the mole ratio of TPA-Br/$SiO_2$=0.05.

The content of Al (aluminum) in the MFI-type aluminosilicate was equal to 0.18% by weight.

III. HC Adsorption and Desorption Test

Supposing an exhaust gas, a test gas having a composition shown in Table 1 was prepared.

TABLE 1

Test gas

| Constituent | Concentration (% by volume) |
| --- | --- |
| $O_2$ | 0.5 |
| $CO_2$ | 14 |
| CO | 0.5 |
| $C_5H_{10}$ | 0.024 |
| $H_2$ | 0.17 |
| NO | 0.05 |
| $H_2O$ | 10 |
| $N_2$ | Balance |

A purifying test was carried out in the following manner: First, 100 g of the MFI-type gallium silicate in a new state was placed into a stationary-bed flowing reaction device. Then, a test gas was supplied to flow within the device at a space velocity of 50,000 $hr^{-1}$, and the temperature of the test gas was raised from normal temperature to 200° C. at rising speed of 20° C./min. The adsorption rate of $C_5H_{10}$ (pentene) and the desorption rate of $C_5H_{10}$ were measured at a predetermined gas temperature. Even when the MFI-type aluminosilicate in a new state was used, a similar measurement was carried out.

Further, the MFI-type gallium silicate and the MFI-type aluminosilicate were subjected to an aging treatment at 900° C. for 20 hours in a reflux gas (comprising 1% by volume of $O_2$ 10% by volume of $H_2O$ and the balance of $N_2$). Then, a measurement similar to that described above was carried out for the MFI-type gallium silicate and the MFI-type aluminosilicate treated as described above.

Figure 2:
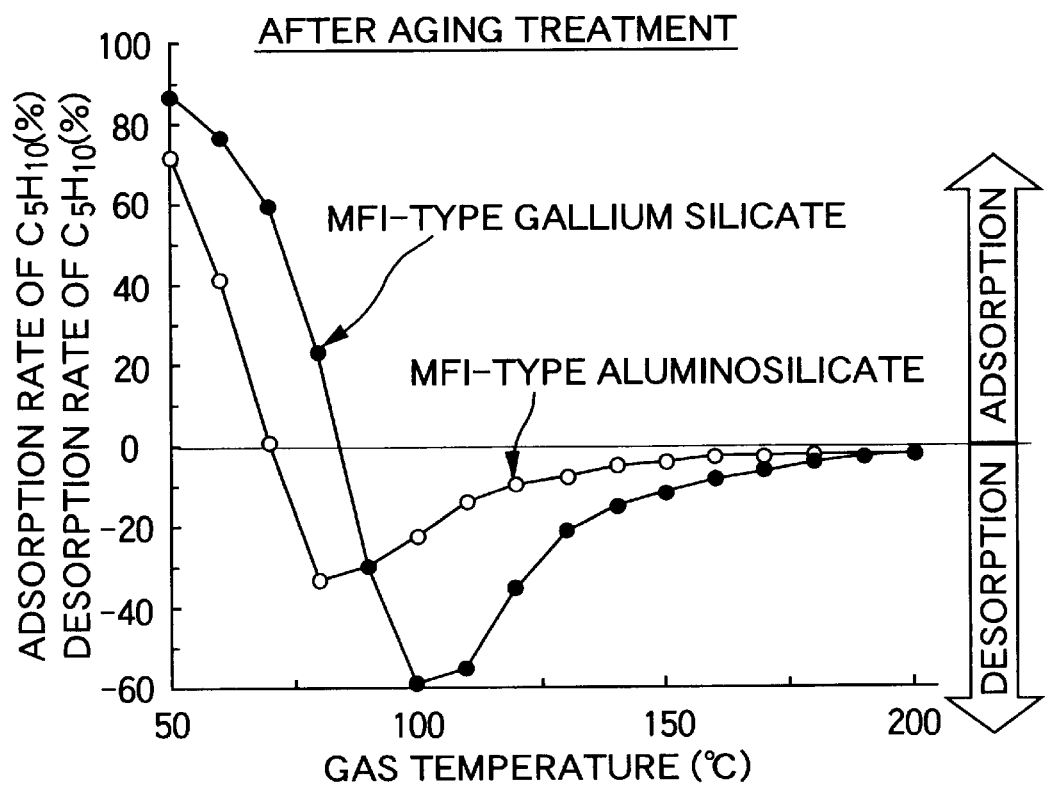

FIGS. 1 and 2 show results of the measurement, FIG. 1 corresponding to the MFI-type gallium silicate in the new state or the like, and FIG. 2 corresponding to the MFI-type gallium silicate after being subjected to the aging treatment or the like. As apparent from FIGS. 1 and 2, the adsorption rate of $C_5H_{10}$ and the desorption rate of $C_5H_{10}$ by the MFI-type gallium silicate after being subjected to the aging treatment are substantially the same as those provided by the MFI-type gallium silicate in the new state. Therefore, it can be seen that the MFI-type gallium silicate has an excellent heat-resistance. On the other hand, the $C_5H_{10}$ adsorbing and desorbing ability of the MFI-type aluminosilicate after being subjected to the aging treatment is lower than that of the MFI-type aluminosilicate in the new state. This is attributable to a low heat-resistance of the MFI-type aluminosilicate.

IV. Content of Al

In the synthesis of the MFI-type gallium silicate described in the item I, various MFI-type gallium silicates having different Al contents were produced by incorporating varied amounts of alumina into the alkali gel of the MFI-type gallium silicate.

For these MFI-type gallium silicates in the new state, the adsorption rate of $C_5H_{10}$ for one minute was measured in the same manner as that described in the item III.

Each of the MFI-type gallium silicates was incorporated into an exhaust system of an engine (having a displacement of 2,200 cc) and subjected to an aging treatment at 800° C. for 100 hours. Then, for each of the MFI-type gallium silicates, a measurement similar to that described above was carried out.

Figure 3:
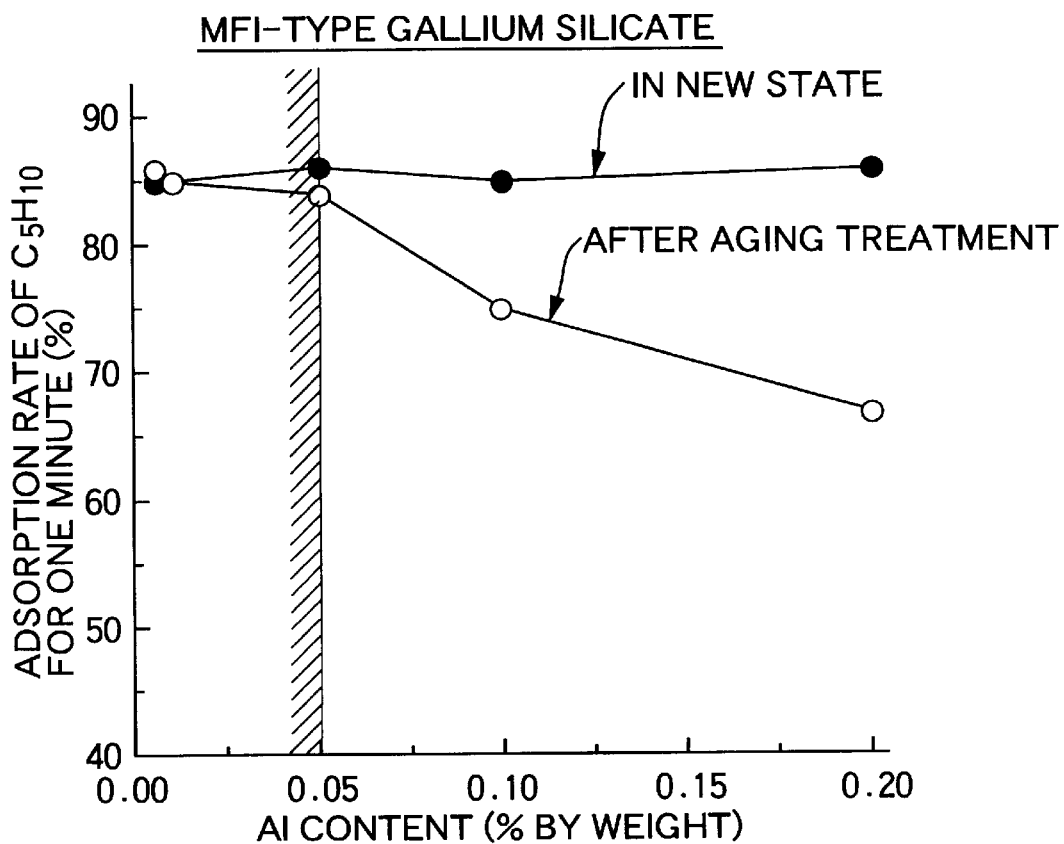
FIG. 3 is a graph showing the relationship between an aluminum content and the adsorption rate of $C_5H_{10}$ for one minute in the MFI-type gallium-silicate.

FIG. 3 shows results of the measurement. It can be seen from FIG. 3 that if the Al content is set in a range of Al≦0.05% by weight, a higher adsorption rate of $C_5H_{10}$ can be obtained even by the MFI-type gallium silicate after being subjected to the aging treatment, as by the MFI-type gallium silicate in the new state. It can be seen from the foregoing that the MFI-type gallium silicate having the Al content set in the range of Al≦0.05% by weight has an excellent heat-resistance.

In the MFI-type gallium silicate, the Ga content is suitably in a range of 0.01% by weight≦Ga≦0.5% by weight. If the Ga content is lower than 0.01% by weight, the crystallizability is deteriorated. On the other hand, if Ga>0.5% by weight, the selectively HC-adsorbing ability is reduced, because the mole ratio of $SiO_2/Ga_2O_3$ is decreased.

V. (1) About 1.3 kg of a powdery MFI-type indium silicate was produced in the same manner as in the item I, except that indium chloride ($InCl_3$ with a purity of 99.999%) was used in place of the gallium chloride used in the item I.

In this case, the composition of the indium silicate alkali gel was as follows: The mole ratio of $SiO_2/InO_3$=750; the mole ratio of $Na_2O/SiO_2$=0.133; the mole ratio of $H_2O/Na_2O$=226; the mole ratio of TPA-Br/$SiO_2$=0.05.

In the MFI-type indium silicate, the In content was equal to 0.6% by weight, the Al content was equal to 0.04% by weight.

(2) For the MFI-type indium silicate in a new state, the HC adsorbing-desorbing test was carried out in the same manner as in the item III, whereby the adsorption and desorption rates of $C_5H_{10}$ (pentene) were measured at a predetermined gas temperature. The MFI-type indium silicate was subjected to an aging treatment in the same manner as in the item III. Then, a measurement similar to that described above was carried out for the MFI-type indium silicate after being subjected to the aging treatment.

Figure 4:
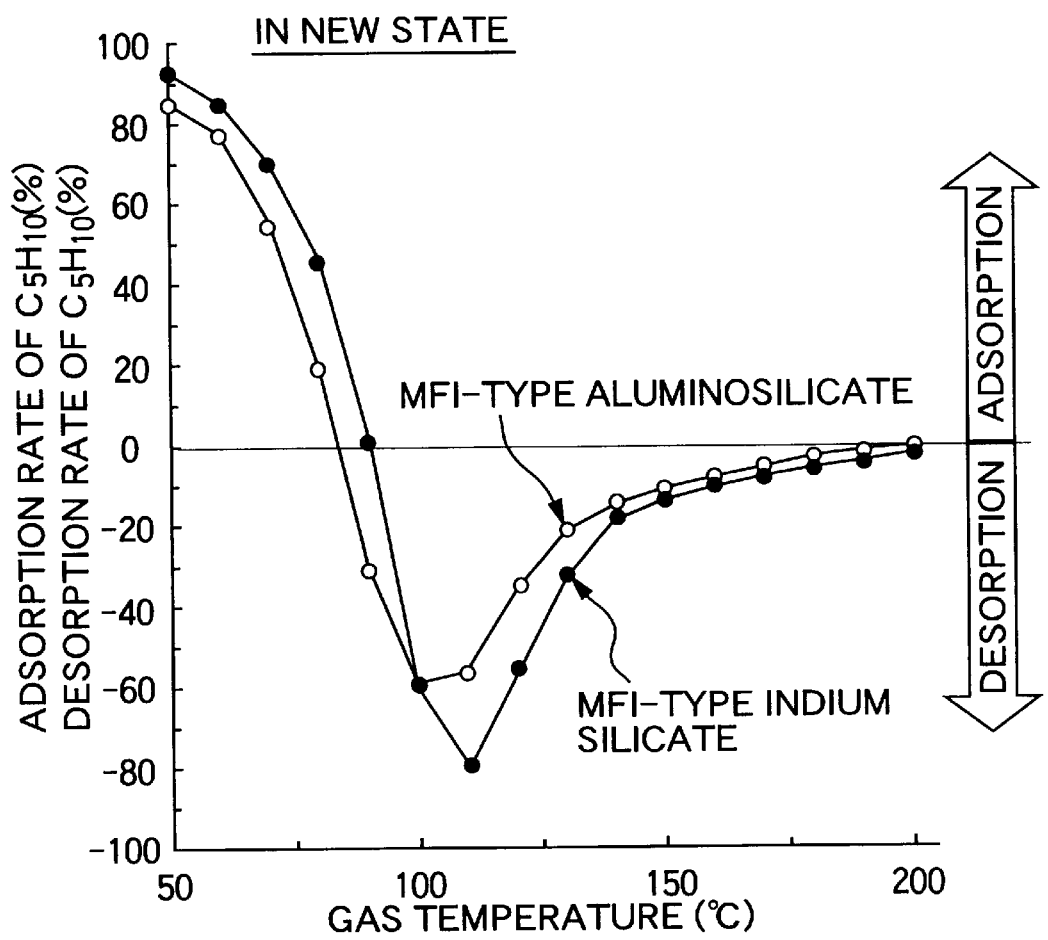
Figure 5:
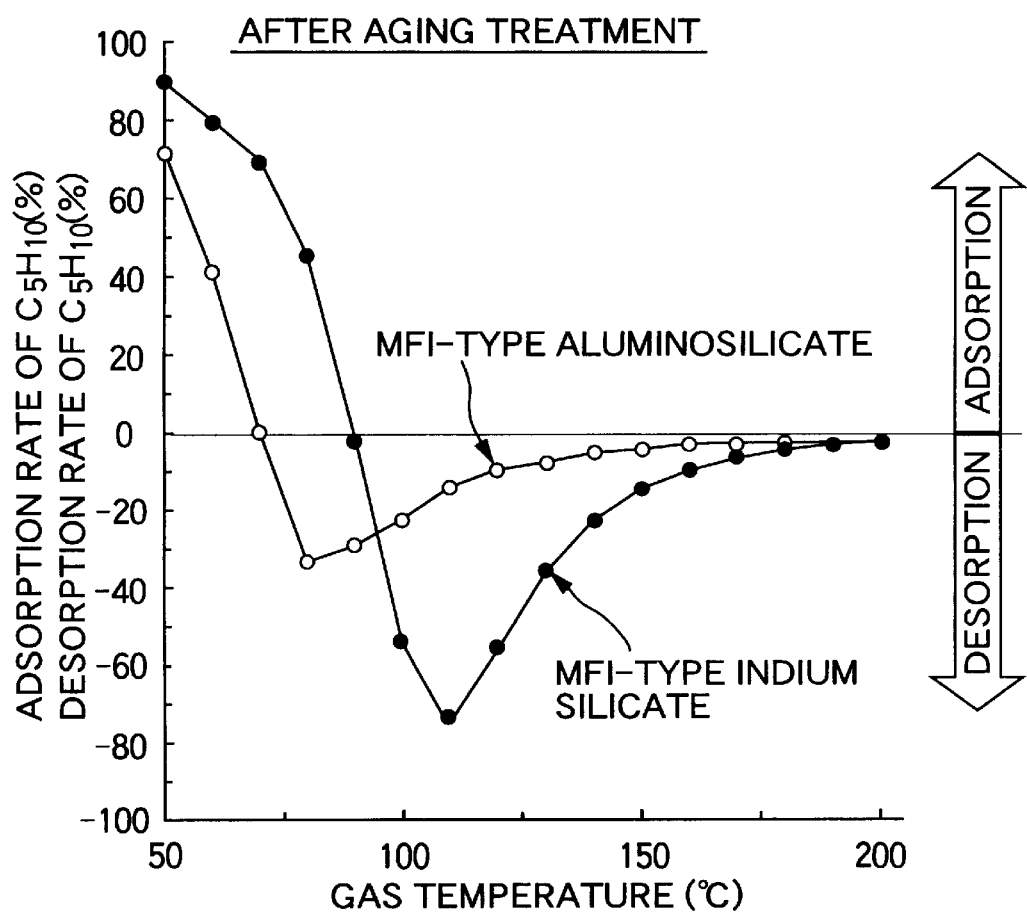

FIGS. 4 and 5 show results of the measurement, FIG. 4 corresponding to the MFI-type indium silicate in the new state, and FIG. 5 corresponding to the MFI-type indium silicate after being subjected to the aging treatment. For the purpose of comparison, data provided by the MFI-type aluminosilicate shown in FIGS. 1 and 2 are also shown in FIGS. 4 and 5. As apparent from FIGS. 4 and 5, the $C_5H_{10}$ adsorption and desorption rates provided by the MFI-type indium silicate after being subjected to the aging treatment are substantially the same as those provided by the MFI-type indium silicate in the new state. Therefore, it can be seen that the MFI-type indium silicate has an excellent heat-resistance.

In the MFI-type indium silicate, the In content is suitably to be a range of 0.01% by weight≦In≦0.6% by weight. If the In content is lower than 0.01% by weight, the crystallization degree is reduced, resulting in an unstable structure. On the other hand, if In>0.6% by weight, the selectively HC-adsorbing ability is reduced, because the mole ratio of $SiO_2/In_2O_3$ is decreased.

The MFI-type metallo-silicate may contain both of gallium and indium as framework forming elements.

What is claimed is:

1. A heat-resistant HC adsorbent comprising an MFI-type metallo-silicate containing at least one of gallium and indium as a framework forming element, and having aluminum as another framework forming element, wherein the aluminum content is $\leq 0.05\%$ by weight.

2. The heat-resistant HC adsorbent according to claim 1, wherein the MFI-type metallosilicate contains at least one of gallium in a range of 0.01% to 0.5% by weight and indium in a range of 0.01% to 0.6% by weight.

3. A heat-resistant HC adsorbent comprising an MFI-type metallosilicate containing indium as a framework forming element, and having aluminum as another framework forming element, wherein the aluminum content is $\leq 0.05\%$ by weight.

4. The heat-resistant HC adsorbent according to claim 3, wherein the MFI-type metallosilicate contains indium in a range of 0.01% to 0.6% by weight.

* * * * *